United States Patent [19]

Ibe et al.

[11] Patent Number: 4,949,002
[45] Date of Patent: Aug. 14, 1990

[54] ROTOR FOR PRINTED-WIRING MOTOR

[75] Inventors: Hiromitu Ibe, Kosai; Yoshimichi Shirai, Toyoake; Takaharu Ura, Kosai, all of Japan

[73] Assignee: Asmo Co., Ltd., Kosai, Japan

[21] Appl. No.: 363,923

[22] Filed: Jun. 9, 1989

[30] Foreign Application Priority Data

Jun. 11, 1988 [JP] Japan .................. 63-142784

[51] Int. Cl.⁵ .................. H02K 3/47; H05K 3/38; B32B 3/06
[52] U.S. Cl. .................. 310/268; 29/846; 310/45; 310/DIG. 6; 428/64; 428/413
[58] Field of Search ........... 29/846; 310/268, DIG. 6, 310/42, 45; 428/64, 65, 66, 413

[56] References Cited

U.S. PATENT DOCUMENTS

| | | | |
|---|---|---|---|
| 3,450,918 | 6/1969 | Burr | 310/268 |
| 4,698,267 | 10/1987 | Tokarsky | 428/413 |
| 4,751,146 | 6/1988 | Maeda et al. | 428/475.8 |
| 4,804,574 | 2/1989 | Osawa et al. | 310/268 |
| 4,814,945 | 3/1989 | Leibowitz | 428/360 |

FOREIGN PATENT DOCUMENTS

| | | |
|---|---|---|
| 48-24281 | 7/1973 | Japan . |
| 53-18501 | 1/1978 | Japan . |
| 53-20719 | 5/1978 | Japan . |
| 62-80304 | 5/1987 | Japan . |

*Primary Examiner*—William H. Beha, Jr.
*Assistant Examiner*—D. L. Rebsch
*Attorney, Agent, or Firm*—Burns, Doane, Swecker & Mathis

[57] ABSTRACT

A rotor for printed-wiring motors includes a flat disk-like non-iron armature mounted on a hub secured to a rotating shaft, the armature being composed of at least two sheet coil assemblies bonded together under heat and pressure with a first thin insulating disc disposed therebetween. Each of the sheet coil assemblies is composed of a pair of sheet coils bonded together under heat and pressure with a second thin insulating disc disposed therebetween. Both the first and second insulating disc are formed of a web of aramid fiber coated with an insulating bonded adhesive.

3 Claims, 2 Drawing Sheets

ROTOR FOR PRINTED-WIRING MOTOR

BACKGROUND OF THE INVENTION

1. Field of the Invention:

The present invention relates to a rotor for a "printed-wiring" motor in which the conductors consist of printed-wiring strips on each side of a thin insulating disc.

2. Prior Art:

In general, conventional printed-wiring motors include a flat rotor or armature composed of a pair of sheet coil assemblies joined together with a thin insulating disc between the sheet coil assemblies. Each sheet coil assembly consists of a pair of sheet coils joined together with a thin insulating disc between the two sheet coils. The insulating disc is composed of sheet mica coated with a thermosetting resin. These mica insulating discs are expensive; and in view of this drawback, relatively inexpensive insulations have been proposed, for example, as shown in Japanese Utility Model Laid-open Publication No. 53-18501. The proposed inexpensive insulating disc is composed of a fabric sheet of glass-wool impregnated with a thermosetting insulating resin.

The known insulating discs are found disadvantageous for the reasons described below. The mica is not only expensive but also is likely to crack or otherwise become broken, because it is characterized by low hardness and perfect basal cleavage. This means that the mica insulating disc must be handled carefully; otherwise, an insulation failure could be caused by the cracked or broken mica insulation disc. Furthermore, the mica generally contains a certain amount of impurities (so-called "red spots") which lower the insulation characteristics of the mica insulation disc. Another drawback associated with the mica insulation disc is that a substantial reduction in bonding strength of the thermosetting insulating resin is likely to occur due to the cleavage of the mica.

The resin-impregnated fabric sheet of glass-wool (the so-called "prepreg" sheet) disclosed in Japanese Utility Model Laid-open Publication 53-18501 has a relatively larger thickness because of a certain lower limit to the diameter of glass fibers. With this larger the thickness, the prepreg sheet lowers the motor efficiency.

The sheet coil is generally formed by stamping a sheet of copper into a predetermined wiring pattern, during which time, burrs are produced on the underside of the stamped sheet coil. When two such stamped sheet coils are joined together in back-to-back confrontation with a thin mica insulating disc disposed therebetween, the burrs bite into the mica and sometimes contact the burrs on the opposite sheet coil, thereby causing a short-circuiting or insulation failure. Since the insulation failure can be found only when the continuity of a rotor is checked, the occurrence of an insulation failure of a sheet coil assembly means discarding a rotor assembly in which the defective sheet coil is used. This insulation failure does not occur when a relatively thick prepreg sheet of glass-wool is used. However, a high motor efficiency is difficult to obtain using the thick prepreg sheet.

SUMMARY OF THE INVENTION

It is accordingly an object of the present invention to provide a rotor for printed-wiring motors which has a flat disc armature composed of sheet coils firmly bonded together into layers and is relatively thin which free from insulation failure such as short-circuiting.

Another object of the present invention is to provide a rotor for printed-wiring motors which can be manufactured efficiently at a low cost.

Briefly stated, a rotor for printed-wiring motors provided in accordance with the present invention is characterized by comprising a thin insulating disc formed of a web of aramid fiber coated with an insulating bonded adhesive.

According to the present invention, there is provided a rotor for printed-wiring motors, comprising: a rotating shaft; a hub firmly secured to the shaft; and a flat disc-like, non-iron armature mounted on the hub and composed of at least two sheet coil assemblies electrically connected together and bonded together under heat and pressure with a first thin insulating disc disposed therebetween; each of the sheet coil assemblies being composed of a pair of sheet coils electrically connected together and bonded together under heat and pressure with a second thin insulating disc disposed therebetween; each of the first and second insulating discs being formed of a web of aramid fibers coated with an insulating bonded adhesive.

The thin aramid fiber web coated with the insulating bonded adhesive ensures that the two sheet coils and two sheet coil assemblies which are composed of the two sheet coils, can be firmly held together without accidental separation.

Since the aramid fiber is strong per se, the overall thickness of the aramid fiber web insulating disc can be reduced, resulting in about 40% weight reduction as compared to the conventional mica insulating disc and a remarkable increase in motor efficiency. Furthermore, the aramid fiber web insulating disc is flexible and has a large tensile strength and hence it is capable of preventing an insulation failure such as short-circuiting which would otherwise occur when the conventional brittle mica insulation disc is used.

The insulating bonded adhesive preferably comprises a thermosetting resin which is more resistant to heat than a thermoplastic resin.

Many other advantages and features of the present invention will become apparent to those skilled in the art upon making reference to the detailed description and the accompanying sheets of drawings in which a preferred structural embodiment incorporating the principles of the present invention is shown by way of illustrative example.

DETAILED DESCRIPTION

The present invention will be described hereinbelow in greater detail with reference to a preferred, but not limiting, embodiment illustrated in the accompanying drawings.

Figure 1A:
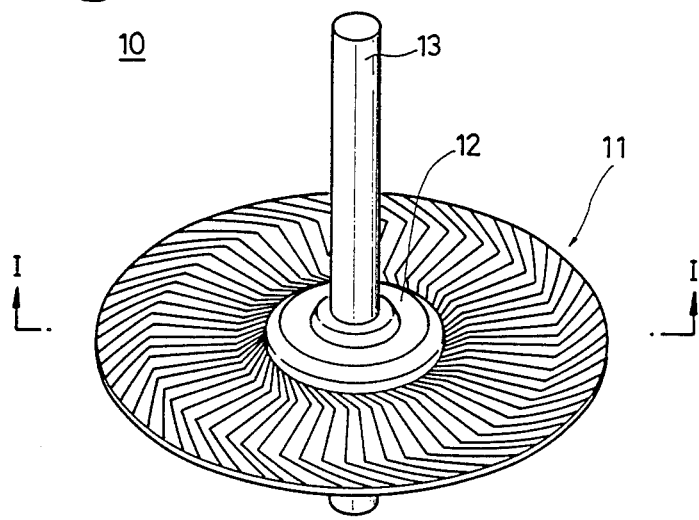
FIG. 1A is a perspective view of a printed-wiring rotor according to the present invention.
Figure 1B:
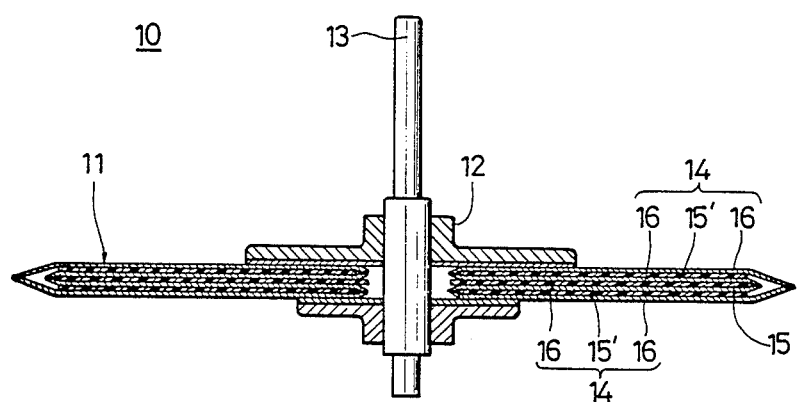
FIG. 1B is a cross-sectional view taken along line I—I of FIG. 1A.
Figure 1C:
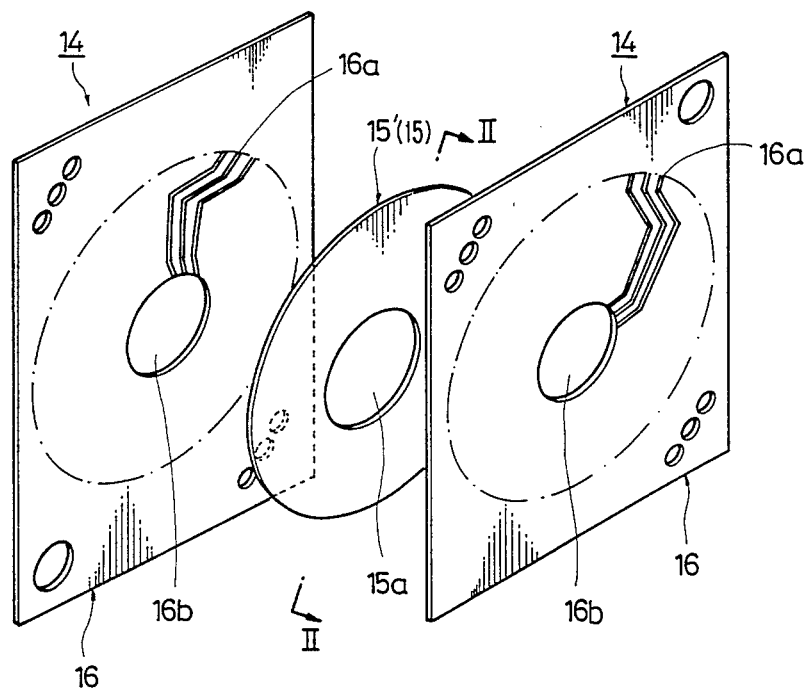
FIG. 1C is a perspective view of a pair of sheet coil blanks and an insulating disc disposed therebetween as they are about to be assembled.

As shown in FIG. 1A, a rotor 10 for printed-wiring motors comprises a flat disc printed-wiring armature 11 firmly secured to a hub 12 fastened to a rotating shaft 13. The armature 11 includes, as shown in FIG. 1B, a pair of sheet copper coil assemblies 14, 14 electrically connected together by welding and bonded together under heat and pressure with a first thin insulating disc 15 disposed between the sheet coil assemblies 14, 14. Each of the sheet coil assemblies 14 is composed of a pair of sheet copper coils 16, 16 electrically connected together by welding and bonded together under heat and pressure with a second thin insulating disc 15, 15' disposed between the sheet coils 16, 16. Each of the sheet coils 16 is formed by stamping out a predetermined wiring pattern 16a from a substantially rectangular rolled sheet blank of copper having a central opening or hole 16b, as shown in FIG. 1C.

Figure 1D:
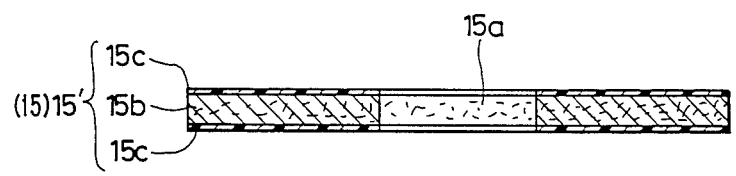
FIG. 1D is an enlarged cross-sectional view taken along line II—II of FIG. 1C.

The first and second insulating discs 15, 15' disposed respectively between the two sheet coil assemblies 14, 14 and between the two sheet coils 16, 16 have a ring shape with a central opening or hole 15a. Each of the insulating discs 15, 15' is composed of a web 15b of aramid fibers, and a pair of coating layers 15c of thermosetting insulating resin on opposite sides of the aramid fiber web 15b, as shown in FIG. 1D.

The aramid fiber is an aromatic polyamide fiber. The thermosetting insulating resin may include an epoxy resin adhesive.

Comparative tests were made for the bonding strength, warpage, distortion and thermal endurance with respect to test samples prepared in the manner as described below.

INVENTIVE EXAMPLE

An insulating disc was prepared by coating a web of aramid fiber (available under the trade name "Normex 410" of E. I. Du Pont) having a thickness of approximately 0.076 mm (3 mils) with about 30 g/m$^2$ of epoxy resin adhesive (bisphenol epoxy resin available from Shinko Chemical Industries Co., Ltd.). After drying the epoxy resin adhesive coating, the insulating disc was placed between a pair of stamped sheet copper coils 0.25 mm thick (similar to the sheet coils 16 shown in FIG. 1C), and then the sheet coils and the insulating disc were bonded together under heat and pressure by heating at a temperature in the range between 150° C. and 190° C., preferably between 160° C. and 180° C., for 30 min. while applying a pressure of 20 kg/cm$^2$. Thus, an inventive sheet coil assembly was produced.

COMPARATIVE EXAMPLE

A pair of sheet coils the same as those used with the inventive example, and a mica insulating disc 0.07 mm thick (a mica sheet available from Okabe Mica Co., Ltd.) were bonded together under heat and pressure in the same manner as done in the inventive example, thereby producing a comparative sheet coil assembly.

(1) Bonding Strength

By using the same number of test samples, a peel test was made for the inventive sheet coil and the comparative sheet coil at the room temperature (about 25° C.) and a humidity of 65%, and the bonding strength was measured by a tension gauge. The average bonding strength of the comparative sheet coil was about 197 g while the inventive sheet coil had an average bonding strength of about 462 g which was 2.3 times larger than that of the comparative sheet coil. An additional peel test was made after test samples were allowed to stand for 96 hours at a temperature of 80° C. and a humidity of 95%. The average bonding strength of the comparative sheet coil was 124 g and the reduction in bonding strength was more than 35%. No reduction in bonding strength was found in the inventive sheet coil.

(2) Warpage and Distortion (2-A) Warpage:

By using the same number of test samples, the inventive sheet coil and the comparative sheet coil were measured for warpage by means of a dial gauge. The average warpage of the comparative sheet coil was about 0.06 mm while the average warpage of the inventive sheet coil was about 0.037 mm which was approximately one-half of the warpage of the comparative sheet coil.

(2-B) Distortion

The same test samples as used in the warpage measurement were then subjected to a distortion measurement with a dial gauge. The average distortion of the comparative sheet coil was about 0.057 mm while the average distortion of the inventive sheet coil was about 0.056 mm.

(3) Thermal Endurance

After the distortion measurement, the test samples were subjected to a heat cycle test in which a cooling stage continuing at −30° C. for 2 hours and a heating stage continuing at 100° C. for 2 hours were alternated over 1000 cycles. The comparative sheet coil failed to withstand more than 200 cycles and an expansion in thickness was found in the comparative sheet coil. No failure such as thickness expansion was found after 1000 cycles in the case of the inventive sheet coil.

The thickness expansion of the sheet coil was caused by a interlaminar expansion occurring between individual flakes of mica. Such expansion is critical because when the thickness of the armature is increased while the motor is rotating, the armature is likely to contact the magnet of the motor, resulting in a layer insulation failure. Thus the motor malfunctions. The inventive armature having the aramid fiber web insulating discs is free from thickness change so that the motor operates reliably over a long service life.

Obviously, various modifications and variations of the present invention are possible in the light of the above teaching. It is therefore to be understood that within the scope of the appended claims the invention may be practiced otherwise than as specifically described.

What is claimed is:

1. A rotor for printed-wiring motors, comprising:
   a rotating shaft;
   a hub firmly secured to said shaft; and
   a flat, disc-like, non-iron armature mounted on said hub and composed of at least two sheet coil assemblies electrically connected together and bonded together under heat and pressure with a first thin insulating disc disposed therebetween, each of said sheet coil assemblies being composed of a pair of sheet coils electrically connected together and bonded together under heat and pressure with a second thin insulating disc disposed therebetween, each of said first and second insulating discs being formed of a web of aramid fibers and a pair of coating layers of insulating bonded adhesive on opposite sides of said aramid fiber web.

2. A rotor according to claim 1, said insulating bonded adhesive comprising an insulating thermosetting resin.

3. A rotor for printed-wiring motors, comprising:
a rotating shaft;
a hub firmly secured to said shaft; and
a flat, disc-like, non-iron armature mounted on said hub and composed of at least two sheet coil assemblies electrically connected together and bonded together under heat and pressure with a first thin insulating disc disposed therebetween, each of said sheet coil assemblies being composed of a pair of sheet coils electrically connected together and bonded together undr heat and pressure with a second thin insulating disc disposed therebetween, each of said first and second insulating discs being formed of aramid fiber paper and a pair of coating layers of insulating bonded adhesive on opposite sides of said aramid fiber paper.

* * * * *